United States Patent
Tinucci et al.

(10) Patent No.: US 6,612,515 B1
(45) Date of Patent: Sep. 2, 2003

(54) TELECOMMUNICATIONS CABLE STORAGE SPOOL

(75) Inventors: Thomas C. Tinucci, Eden Prairie, MN (US); John C. Holman, Coon Rapids, MN (US); Trevor D. Smith, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/649,361

(22) Filed: Aug. 28, 2000

(51) Int. Cl.[7] ............................................. B65H 75/38
(52) U.S. Cl. .................. 242/388.1; 242/388.5; 242/588.6; 242/604; 242/611.2; 242/612; 242/614; 385/135; 206/397
(58) Field of Search .......................... 242/388.1, 388.5, 242/388.6, 604, 605, 614, 611.2, 612, 596.8, 597.8, 598.6, 588.6; 206/389, 397, 408, 409; 385/135

(56) References Cited

U.S. PATENT DOCUMENTS

| | | | |
|---|---|---|---|
| 3,064,917 A | * 11/1962 | Roberts et al. | 242/614 |
| 3,948,457 A | * 4/1976 | Spreitzer | 242/612 |
| 4,359,262 A | 11/1982 | Dolan | |
| 4,687,289 A | 8/1987 | DeSanti | |
| 4,792,203 A | 12/1988 | Nelson et al. | |
| 4,798,432 A | 1/1989 | Becker et al. | |
| 4,995,688 A | 2/1991 | Anton et al. | |
| 5,066,149 A | 11/1991 | Wheeler et al. | |
| 5,069,523 A | 12/1991 | Finzel et al. | |
| 5,074,635 A | 12/1991 | Justice et al. | |
| 5,093,885 A | 3/1992 | Anton | |
| 5,115,489 A | 5/1992 | Norris | |
| 5,208,894 A | 5/1993 | Johnson et al. | |
| 5,247,603 A | 9/1993 | Vidacovich et al. | |

(List continued on next page.)

FOREIGN PATENT DOCUMENTS

| | | |
|---|---|---|
| FR | 2579330 | 3/1985 |
| WO | WO 95/07480 | 3/1995 |
| WO | WO 96/10203 | 4/1996 |
| WO | WO 96/19745 | 6/1996 |
| WO | WO 00/17693 | 3/2000 |

OTHER PUBLICATIONS

ADC Telecommunications FL2000 Splice Panel Installation Instructions, 12 pages, Issue 5, Jan. 1998.

(List continued on next page.)

Primary Examiner—John Q. Nguyen
(74) Attorney, Agent, or Firm—Merchant & Gould P.C.

(57) ABSTRACT

A ribbon cable storage spool, tray and method of use. The spool comprising a center post and a plurality of radially extending top and bottom fins. The spool may also comprise a guide wall, a ribbon retention tab, a channel wall defining a channel and a ledge, and an oblong shape. The tray comprising a bottom plate and a sidewall which act together to define a spool chamber for receiving the spool. The bottom plate may also define holes such that the bottom fins of the spool are coplanar with the bottom plate when the spool is placed in the tray. The bottom plate may also include a column to be received by the channel of the spool. The channel and column may include a tongue and groove arrangement for preventing rotation of the spool relative to the tray. The column may also include a flexible clip for retaining the spool in the tray. A method for winding a length of cable onto a spool without twisting the wires including the steps of crossing two lengths of the loop, first-flipping the spool, second-flipping the spool, and repeating these steps until the length of the loop is wound around the spool.

13 Claims, 8 Drawing Sheets

U.S. PATENT DOCUMENTS

| | | | |
|---|---|---|---|
| 5,249,252 | A | 9/1993 | Noto |
| RE34,955 | E | 5/1995 | Anton et al. |
| 5,481,639 | A | 1/1996 | Cobb et al. |
| 5,511,144 | A | 4/1996 | Hawkins et al. |
| 5,519,804 | A | 5/1996 | Burek et al. |
| 5,559,922 | A * | 9/1996 | Arnett ................. 385/135 |
| 5,717,811 | A | 2/1998 | Macken |
| 5,802,237 | A | 9/1998 | Pulido |
| 6,215,938 | B1 * | 4/2001 | Reitmeier et al. ........ 385/135 |
| 6,327,414 | B1 * | 12/2001 | Strause et al. ........... 385/135 |

OTHER PUBLICATIONS

ADC Telecommunications FlexLight 2000™ System Planning and Application Guide, 1st Edition, Issue 1, Apr. 1994, 44 pages.

ADC Telecommunications brochure entitled "AGX 72 Fiber Outside Plant Panel," 4 pages, dated Jan. 1995.

ADC Telecommunications catalog entitled "FL2000 System Second Edition," dated Jan. 1995, 43 pages.

ADC Telecommunications catalogue entitled "Fiber Panel Products Second Edition," 117 pages, dated Jul. 1996.

* cited by examiner

TELECOMMUNICATIONS CABLE STORAGE SPOOL

FIELD OF THE INVENTION

The present invention is concerned with the management and storage of telecommunications cables. The management device of the present invention has particular application in the management and storage of fiber optic ribbon cables.

BACKGROUND OF THE INVENTION

In telecommunications systems, it is important to protect the signal carrying telecommunications cables, while maintaining the cables in an organized manner. The telecommunications industry relies on storage devices, such as spools, to manage and store slack lengths of cable between communications components. Such slack lengths of cable may include ribbon cables including fiber optic ribbon cables.

When managing and storing ribbon cables it is important to protect the cables from the deleterious effects of both bending a cable below its minimum bend radius, as well as twisting of the ribbon cable. Both cause attenuation and loss of signal strength. Twisting or bending the ribbon cable also may cause the cable to break resulting in a complete disruption of the signal. Furthermore, the most efficient use of storage space for ribbon cable is accomplished when the ribbon cable is wound without twisting.

Therefore, there is continued need in the art for further cable management devices and methods which address such concerns in the telecommunications industry. as ease of use, size, reliability, cost, and protection of the cables, in particular ribbon cables.

SUMMARY OF THE INVENTION

One aspect of the present invention includes a storage spool for storing a length of slack cable, such as ribbon cable. The spool includes a center post from which radially extend end members, preferably configured as a plurality of top and bottom fins. The spool may be used in cooperation with a tray for holding the spool. The spool also allows for winding a length of ribbon cable onto a spool without twisting.

Another aspect of the present invention includes a tray for holding a storage spool. The tray includes bottom plate and a sidewall. The tray is shaped to receive the storage spool. The tray may also hold an insert instead of a cable storage spool, where the insert includes a telecommunications device, such as a splice or other circuit component.

A further aspect of the present invention relates to a tray for holding a storage spool or other insert, the spool having a plurality of bottom fins, and the tray including a bottom plate and a sidewall. The bottom plate of the tray defines a pattern of holes to correspond to the bottom fins of the spool to be stored. The holes allow for reducing the vertical profile of the tray and spool assembly, thereby allowing for more efficient use of storage space.

Another aspect of the present invention includes a cable storage spool that has an oblong outer profile which allows for storing longer and analog lengths of cable even when the spool has been wound close to its capacity with cable.

A further aspect of the present invention relates to placing guide walls on the fins of a storage spool as discussed above which will assist in guiding and managing the ribbon cable.

Another aspect of the present invention relates to a tray that includes a retention mechanism, such as a flexible clip arrangement having a push tab, where the retention mechanism retains the spool or other insert in the tray unless the retention mechanism is released. The spool or other insert can also include features of a retention mechanism for releasable retention with the tray.

A still further aspect of the present invention relates to modular cable management inserts and trays for receiving the modular cable management inserts. The trays for the inserts may be stacked, and hingedly mounted or otherwise movable for accessibility. The inserts can include cable storage features or signal processing or other management functions, such as couplers or splices.

A further aspect of the present invention relates to a method for winding a loop of ribbon cable having remote ends around a storage spool without twisting the ribbon cable. The method includes the steps of placing a spool inside the loop of cable, pulling the spool away from the remote ends of the cable until the spool contacts the cable along a portion of the circumference of the spool, thereby defining a left length of cable from a right length of cable; crossing the left and right lengths of cable between the spool and the remote ends such that the left length of cable and the right length of cable necessarily cross twice; first-flipping the spool 180° along an axis perpendicular to the direction the lengths of cable lead away from the spool, the flipping being toward the remote ends of the cable so that the crossed lengths of cables wrap around the spool without twisting, after first-flipping the spool a single crossing of the left and right lengths of cable remains between the spool and the remote ends of the cable; second-flipping the spool 180° along the same axis and in the same direction as the first-flipping, the flipping being toward the remote ends of the cable so that the crossed lengths of cable wrap around the spool without twisting, after second-flipping the spool the left and right lengths of cable no longer cross between the spool and the remote ends of the cable; and repeating the crossing, first-flipping, and second-flipping steps until there remains insufficient cable in the loop to complete an additional flip.

DETAILED DESCRIPTION OF THE PREFERRED EMBODIMENTS

Figure 1:
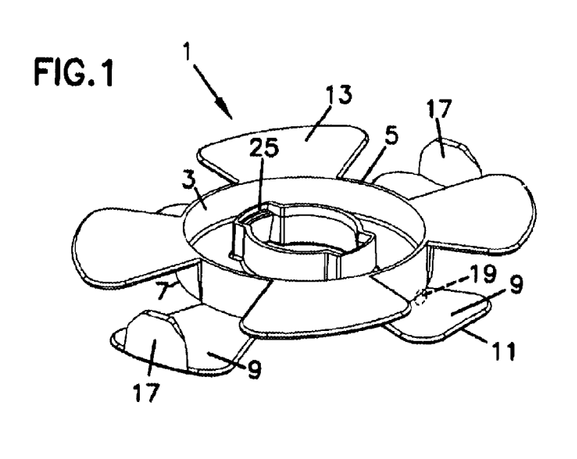
FIG. 1 is a perspective view of a storage spool according to the present invention.

Referring now to the several drawing figures in which identical elements are numbered identically, a telecommunications storage spool 1 according to the present invention is shown. The spool 1 includes a center post 3 characterized by a center axis 4. The cable is managed and stored by being wrapped around the center post 3. Preferably the center post 3 has a radius that is not less than the minimum bend radius for the cable to be stored. The center post 3 has a top end 5 and a bottom end 7. The distance which separates the top end 5 from the bottom end 7 of the center post 3, in part, will determine the storage capacity of the spool 1. Typically this distance is several times the width of the cable to be stored.

The spool 1 is particularly useful for storing and managing ribbon fiber optic cable. However, ribbon copper cables, and round cables (fiber, copper, other) can be conveniently stored by the spool 1. The center post 3 of the spool 1 includes radially extending end members preferably configured as a plurality of top and bottom fins 13 and 9.

From the top end 5 of the center post 3 extend a plurality of top fins 13. From the bottom end 7 of the center post 3 extend a plurality of bottom fins 9. The radially extending top fins 13 lie in a plane perpendicular to the center axis which characterizes the center post 3. Similarly, the bottom fins 9 lie in a plane perpendicular to the center axis. The fins 13 and 9 are spaced around the circumference of the center post 3. The top fins 13 along with the bottom fins 9 act to keep the ribbon cable wrapped around the center post 3 in a cable chamber 14. In the preferred embodiment, the spool 1 to be used in cooperation with a holder or tray 30.

Figure 2:
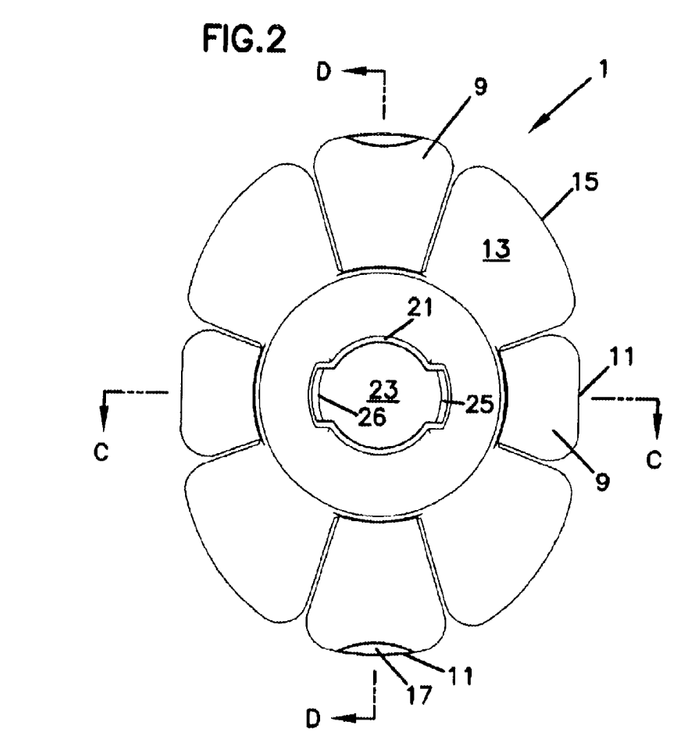
FIG. 2 is a top view of the spool of FIG. 1.
Figure 3:
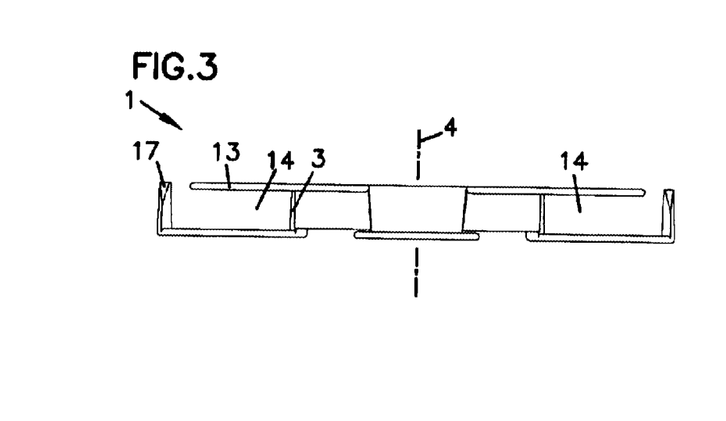
FIG. 3 is a side view of the spool shown in FIG. 2.

Each top fin 13 and each bottom fin 9 have outer edges 15 and 11 respectively. The outer edges 15 and 11 of the fins are the edges of the fins that are furthest from the center post 3. As seen in FIG. 2, the outer edges 15 and 11 of the fins, define an outer profile of the storage spool 1. The outer profile of the spool as shown in FIG. 2 is oblong. That is, the fins of the spool 1 which lie along a major axis of the spool 1, line D—D, are longer than the fins which lie along the minor axis of the spool 1, line C—C. Shaping and sizing the fins of the spool 1 to create an outer profile that is substantially oblong allows both for longer lengths of ribbon cable to be stored as well as for analog lengths of ribbon cable to be stored especially when the spool 1 already holds close to its capacity of cable. For example, as the ribbon cable is wound around the center post 3, eventually the cable will fill the space which separates the outer edge of the fins along the minor axis C—C, and the center post 3. Additional length of cable can still be inserted into the spool by "stuffing" the cable. "Stuffing" refers to pushing additional cable onto the spool after cable loops around the center post 3 have filled the space between the outer edge of the fins along the minor axis C—C and the center post 3. Stuffing the cable makes loops of cable around the center post 3 in oval or oblong shapes instead of tight circles. Stuffing is made possible by the oblong outer profile of the spool 1. Because stuffing is hindered when the ribbon cable is twisted, it is important not to twist the ribbon cable as it is wound around the spool 1.

As shown in FIG. 2, in the preferred embodiment, none of the fins 9, 13 oppose one another in the direction of the center axis. Such a construction promotes ease of molding from materials such as plastic. Instead of fins 9, 13, plates or other structures can be provided for holding the cable in an organized manner.

The spool 1 may also comprise guide walls 17 on some or all of the fins to assist in managing the ribbon cable as it is wound on the spool 1 and maintained in the cable chamber 14. Guide walls 17 are positioned adjacent the end of one or more of fins 9, 13.

A ribbon retention tab 19 optionally may be included in the spool 1 (See FIG. 1). The ribbon retention tab 19 is separated from the center post 3 by a distance approximately equal to the thickness of the cable to be stored. The retention tab 19 acts to closely retain the cable between itself and the center post 3. Holding one point along the length of the cable in place relative to the spool 1 may help simplify the process of winding a loop of ribbon cable on the spool 1.

Figure 4:
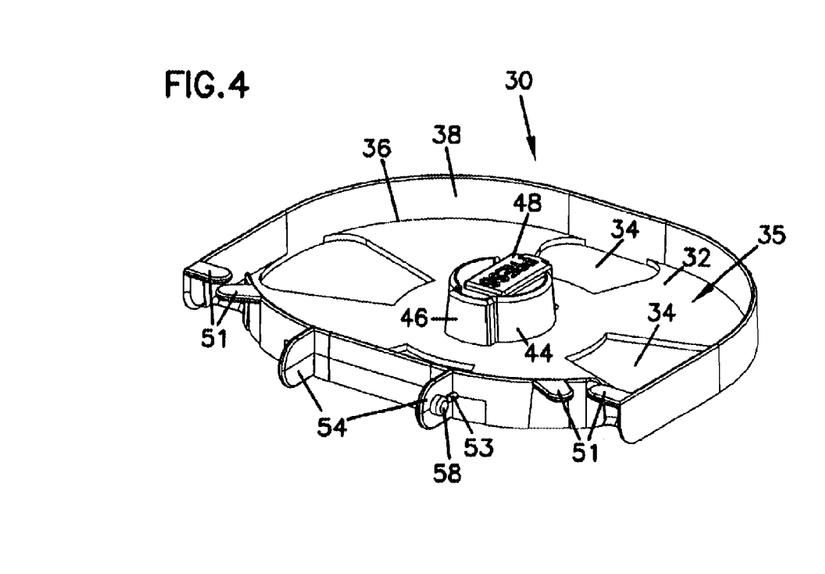
FIG. 4 is a perspective view of a holder for a storage spool according to the present invention.
Figure 5:
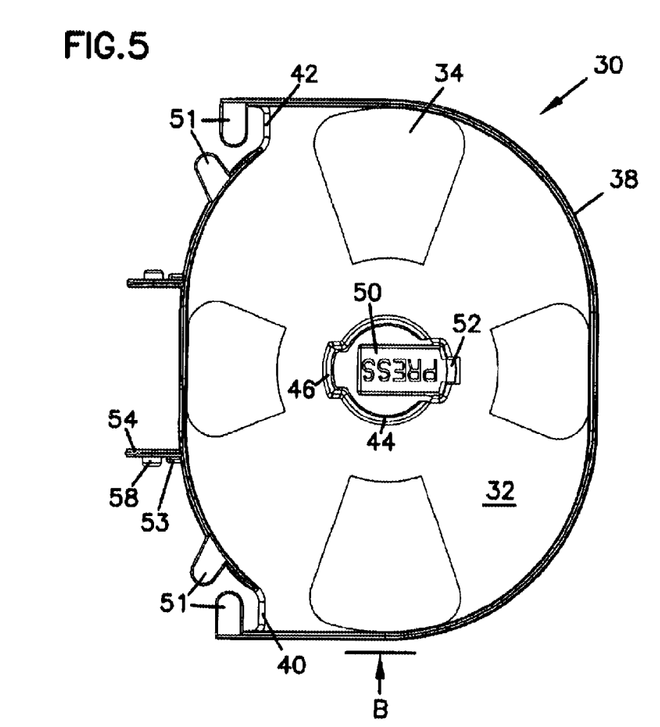
FIG. 5 is top view of the holder shown in FIG. 4.
Figure 6:
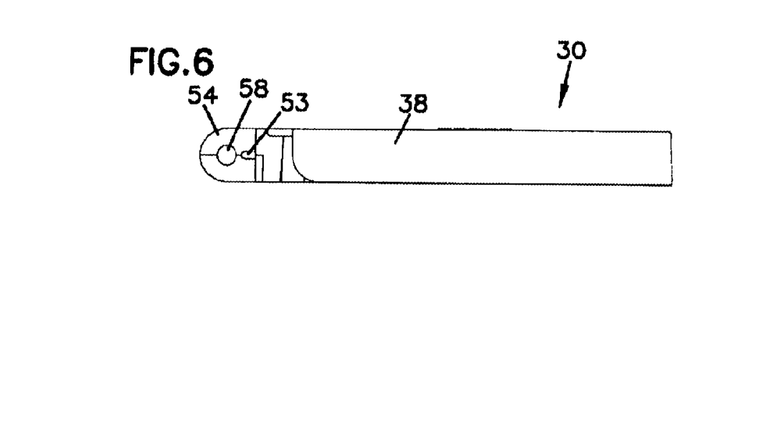
FIG. 6 is a side view of the holder shown in FIG. 5.

The spool 1 may be used in conjunction with a spool tray 30 for storing the spool 1. The tray 30 includes a bottom plate 32 and a sidewall 38. The sidewall 38 and the bottom plate 32 define a spool chamber 35 for receipt of the spool. The sidewall 38 defines a port or ports 40 and 42 for allowing entry and exit of the ribbon cable to the spool 1 when the spool 1 is placed inside the tray 30. The spool tray 30 may also include cable management tabs 51 extending from the sidewall 38 near the cable ports 40 and 42.

Figure 7:
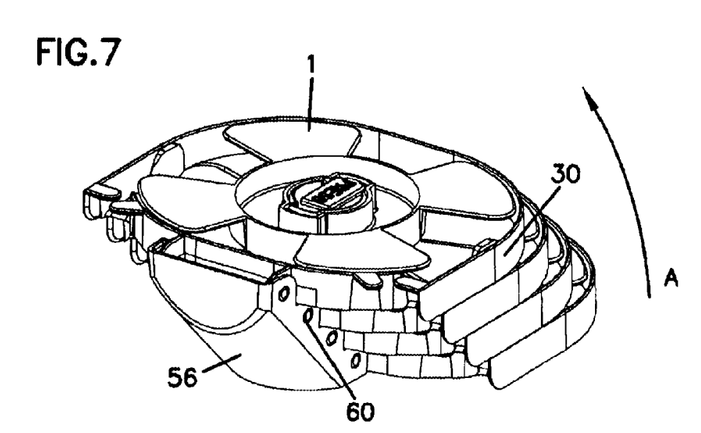
FIG. 7 is a perspective view of a series of storage spools and spool holders stacked with a hinge structure.
Figure 8:
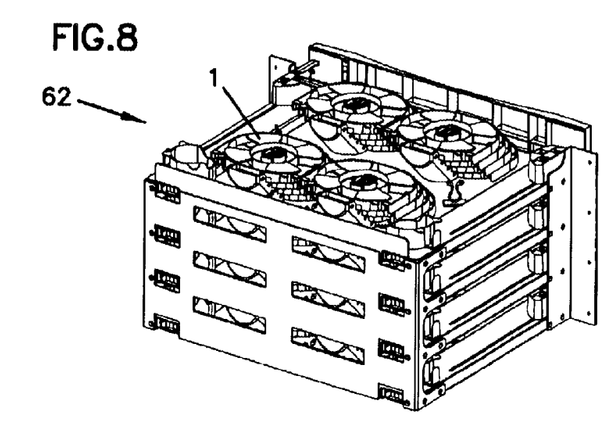
FIG. 8 is a perspective view of a chassis for housing spools and holders according to the present invention.
Figure 9:
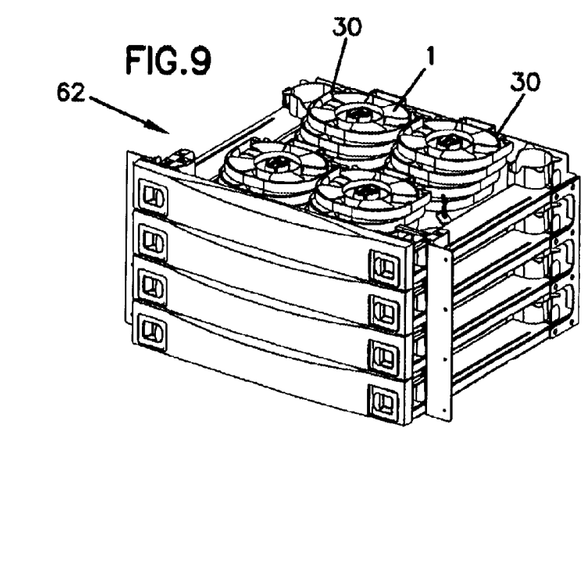
FIG. 9 is a second perspective view of the chassis of FIG. 8.
Figure 10:
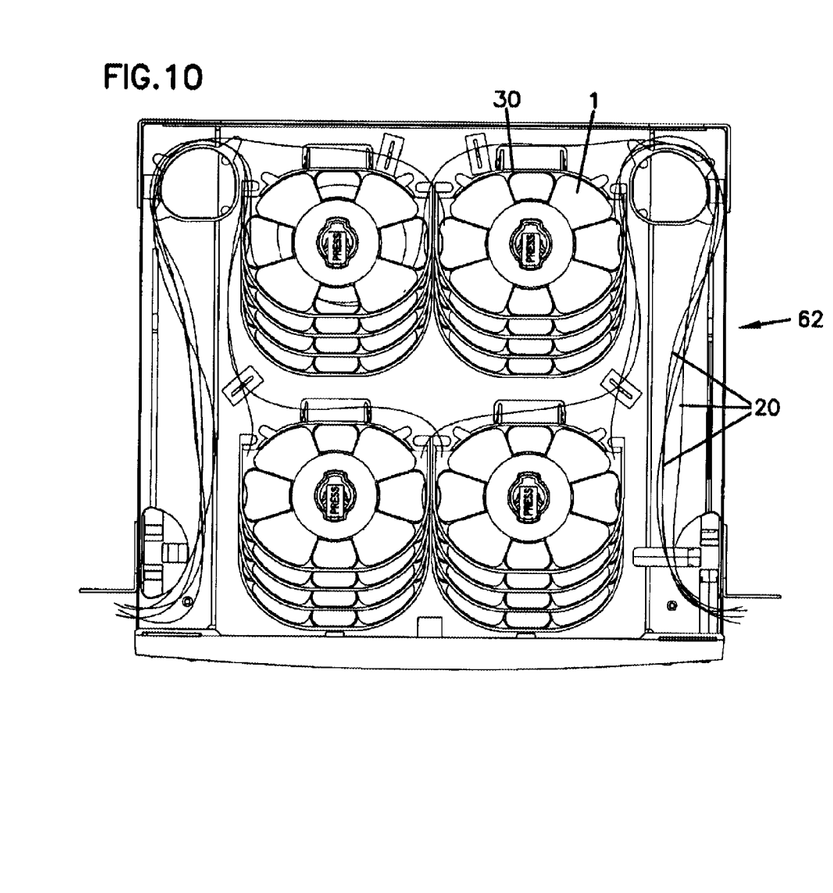
FIG. 10 is a top view of a chassis, showing cables entering and exiting the chassis.

A number of spools may be stored in stacks of trays as is shown in FIGS. 7 and 10. The trays 30 may be staggered and hinged to allow for easy access to each spool in the stack. The trays 30 may also be vertically stacked on top of one another in a chassis or other structure which allows individual access.

The bottom plate 32 of tray 30 may define a series of holes 34 which correspond to the bottom fins 9 of the spool 1. The holes 34 permit the bottom fins 9 to be coplanar with the bottom plate 32 when the spool 1 is placed in the tray 30, reducing the vertical profile of the spool-tray assembly thereby making more efficient use of storage space.

The tray 30 may include a central column 44. The column 44 is configured to be received by a similarly configured channel 23 in the spool 1. The channel 23 is defined by a channel wall 21 inside.the center post 3. As shown in the figures, the column 44 of the tray 30 may include a tongue member 46 configured to be received by a similarly configured groove 26 defined by the channel wall 21 of the spool 1 to prevent rotation of the spool 1 relative to the tray 30.

The column 44 may also include a flexible clip 48 or other retaining structure for retaining the spool 1 inside the tray 30. The flexible clip 48 includes a push tab 50 and a protruding edge 52. The protruding edge 52 is configured to fit into a ledge 25 defined by the channel wall 21 of the spool 1. The spool 1 may be removed from its position inside the tray 30 when the push tab 50 of the flexible clip 48 is depressed. The flexible clip 48 or other retaining structure can also be positioned on spool 1, if desired.

Figures 13, 14:
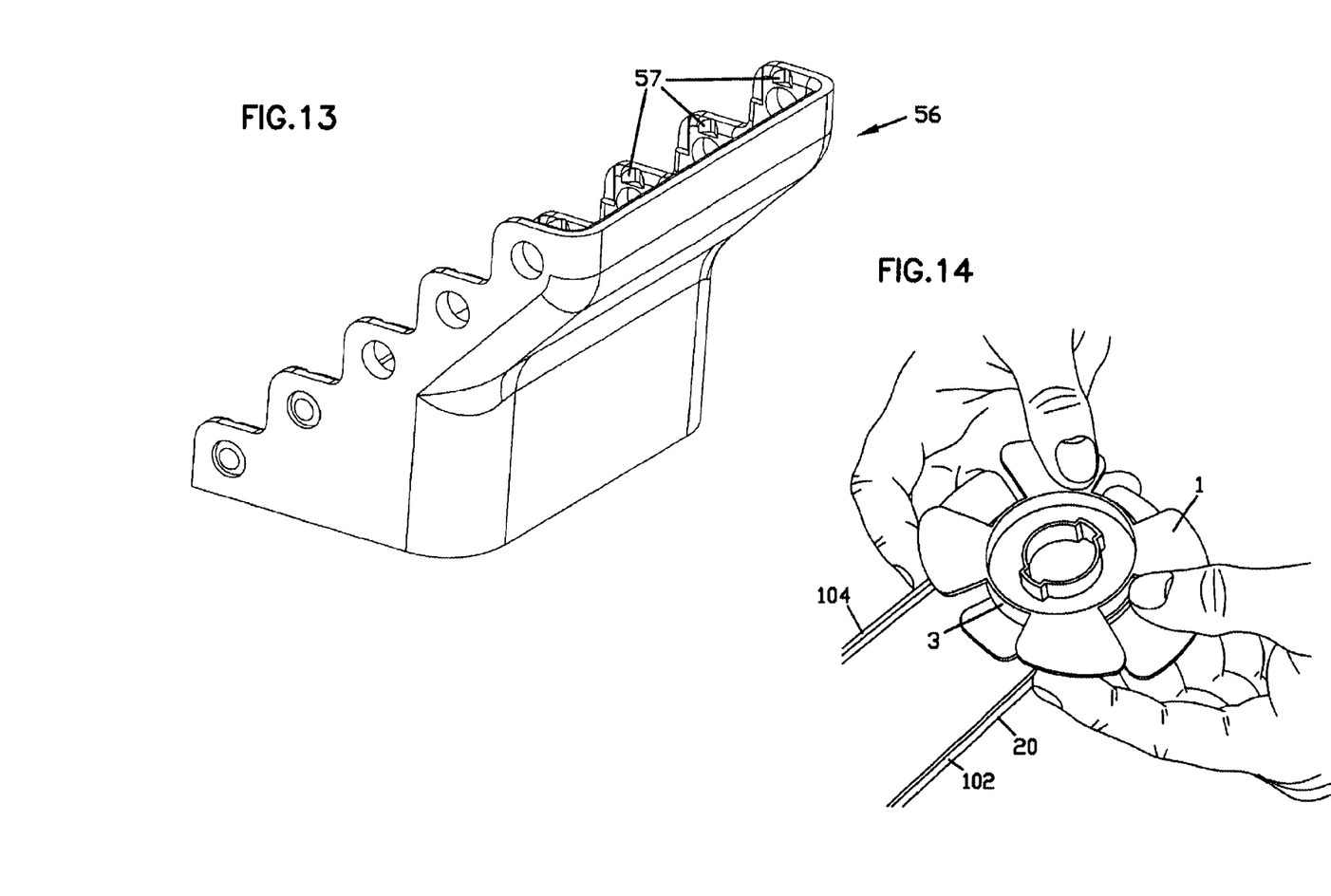
FIG. 13 is a perspective view of a storage tray mount according to the present invention.
FIG. 14 is a perspective view of a first position in a method according to the present invention for winding cable on a spool without twisting the cable.

The tray 30 may also include hinge tabs 54. The hinge tabs 54 allow the tray 30 to be rotatably mounted to a storage tray mount 56 as is shown in FIG. 7. Either the hinge tabs 54 or the storage tray mount 56 may include posts 58 while the other includes matching holes 60 for receiving the posts 58. The hinge tabs 54 may include retention bumps 53. A plurality of trays 30 may be rotatably stacked in staggered stacks for easy access to the cable storage spools 1. The trays flip in the direction of Arrow A in FIG. 7 to allow access to the underneath trays. One or more staggered stacks of trays may then be stored in a storage tray mount 56 and disposed in a tray housing or chassis 62. Chassis 62 may have one or more moveable (for example, slideable) drawers each with a number of stacks of spools and trays.

A detent arrangement may be provided for holding the trays in a flipped-up position. Storage tray mount 56 (See FIG. 13) includes a notch or groove 57 sized for receiving retention bump 53 to maintain each tray in an upward pivoted position when placed there by the user. The trays 30 stay pivoted upwardly to allow easy and hands-free access to the tray underneath the flipped tray or trays. Preferably, the trays 30 are made from plastic.

Figure 11:
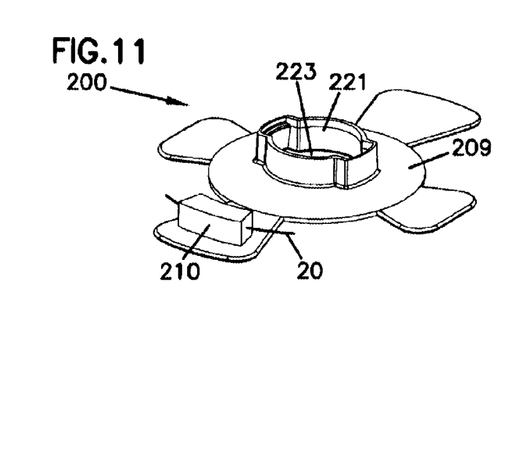
FIG. 11 is a perspective view of a modular cable management insert according to the present invention for holding a telecommunications device.
Figure 12:
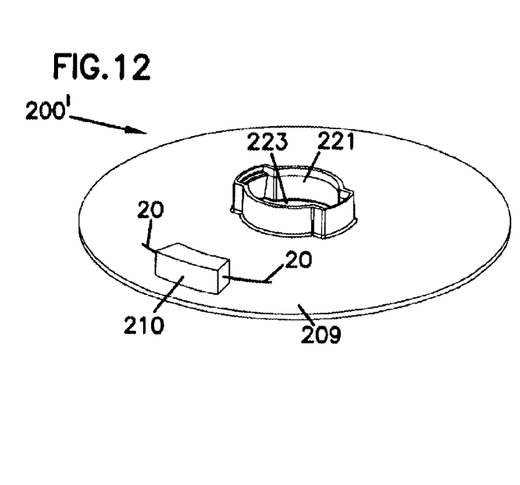
FIG. 12 is a perspective view of another embodiment of a modular cable management insert according to the present invention for holding a telecommunications device.

Tray 30 may also be used to receive modular cable management inserts 200 and 200' instead of cable spools 1. The modular inserts 200 and 200' include a bottom plate 209 which may comprise bottom fins, and a channel wall 221 defining a channel 223. The channel wall 221 may be adapted like the channel wall 21 of spool 1 to receive column 44, tongue 46, and flexible clip 48 of the tray 30 thereby retaining the modular insert within the tray 30 unless the push tab 50 is depressed. A variety of devices 210 may be disposed on the bottom plate 209 of the modular insert 200 and 200', e.g. attenuators, couplers, switches, wave dimension multipliers (WDMs), splitters/combiners, splices, adapters. The inserts 200, 200' can include cable storage features as well, such as a center post.

The present invention also relates to a method for winding a loop of ribbon cable having remote ends onto a storage spool without twisting the cable as it is wound. As shown in FIG. 14, the spool 1 with its center post 3 is placed inside the loop of cable 20 and is pulled away from the remote ends of the cable until the spool contacts the cable along a portion of the circumference of the center post and thereby defining a left length of cable 102 from a right length of cable 104. The major dimension of the cable lies along the center post as shown in FIG. 14.

Figure 15:
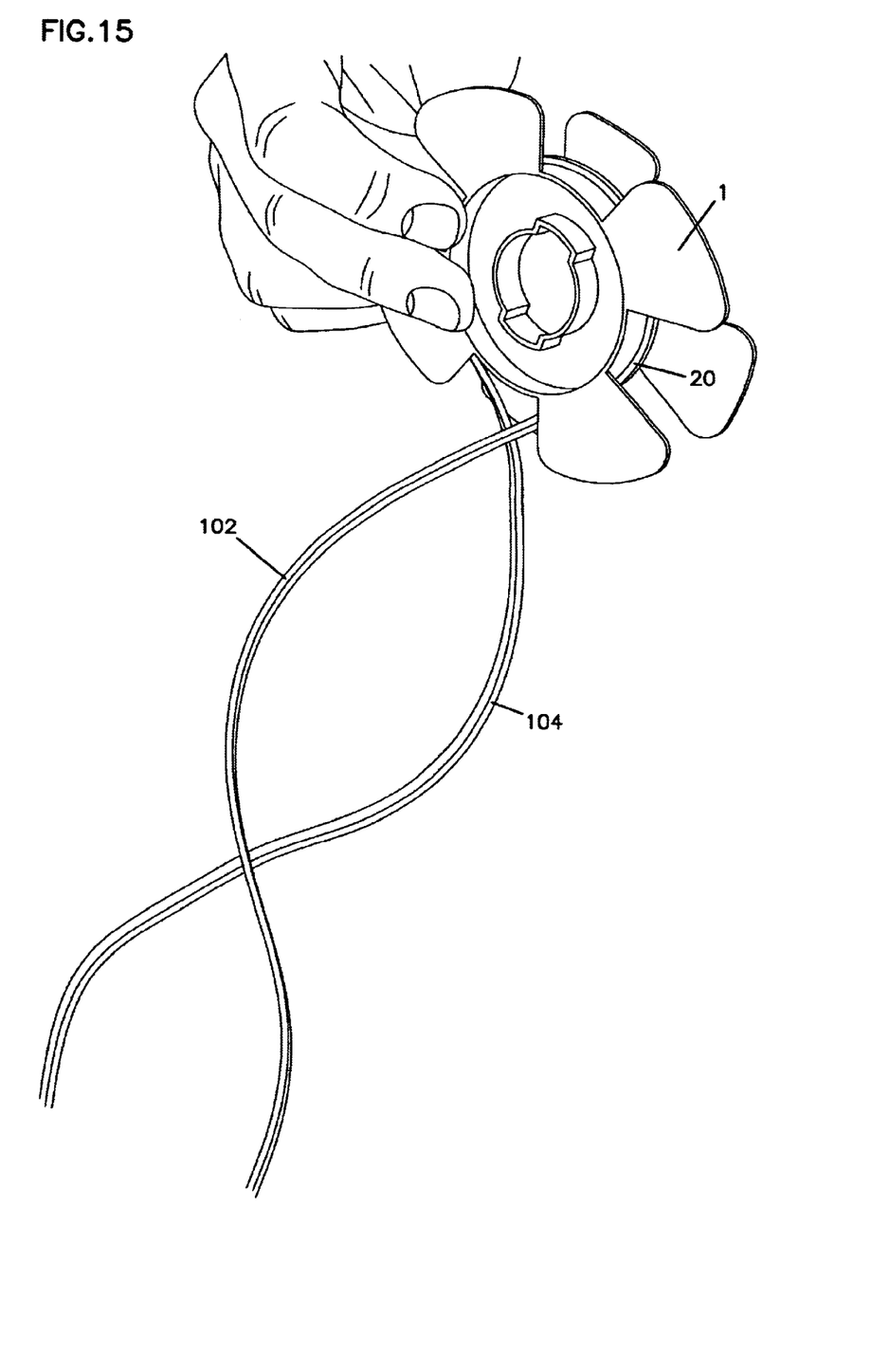
FIG. 15 is a perspective view of a second position in a method according to the present invention for winding cable on a spool without twisting the cable.

The left and right lengths of cable 102 and 104 are crossed between the spool 1 and the remote ends of the cable as shown in FIG. 15. By doing so, the left and right lengths of cable must necessarily cross each other twice if the remote ends of the cable maintain fixed positions.

Figure 16:
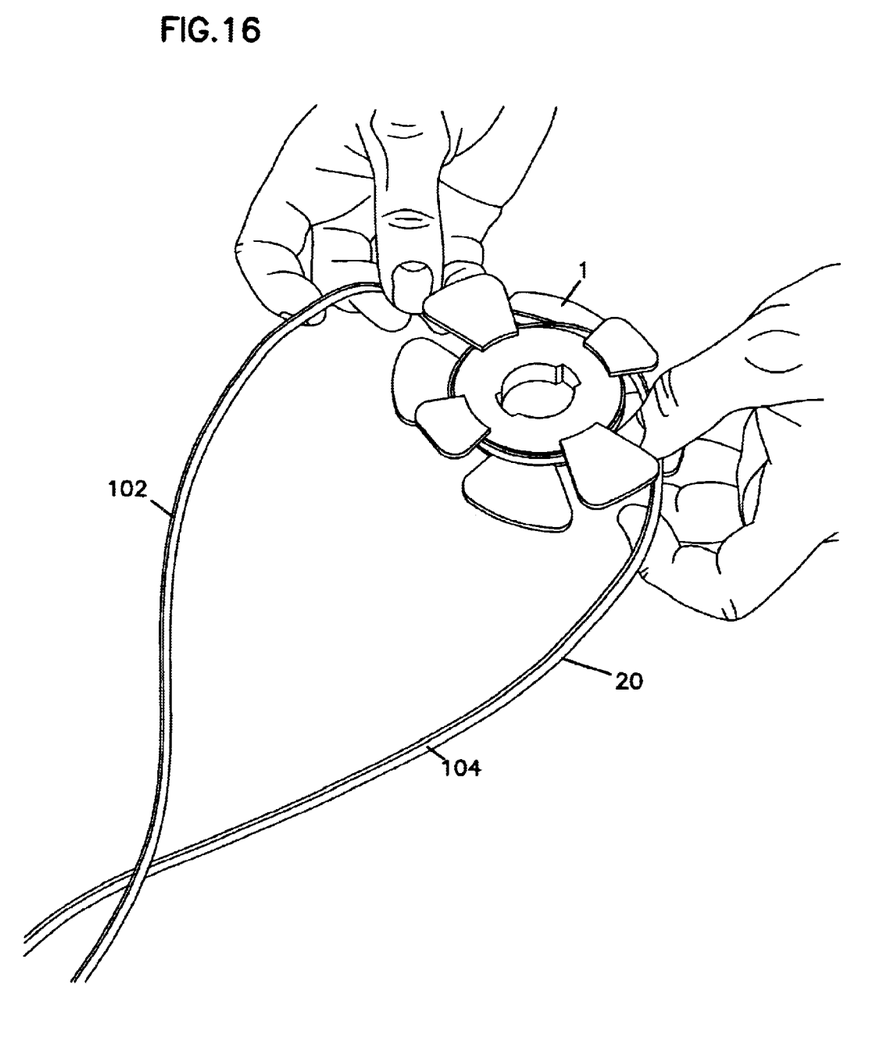
FIG. 16 is a perspective view of a third position in a method according to the present invention for winding cable on a spool without twisting the cable.

The spool is then "first-flipped", meaning the spool is flipped 180° along an axis perpendicular to the direction the lengths of cable 102 and 104 lead away from the spool as shown in FIG. 15. The first-flipping is toward the remote ends of the cable so that the crossed lengths of cables wrap around the center post of the spool without twisting. After first-flipping the spool a single crossing of the left and right lengths of cable remains between the spool and the remote ends of the cable as shown in FIG. 16.

The spool is then "second-flipped", meaning the spool is flipped 180° along the same axis and in the same direction as the first-flipping. During the second-flipping, like the first-flipping, the crossed lengths of cable wrap around the center post of the spool without twisting. However, after second-flipping, the left and right lengths of cable no longer cross between the spool and the remote ends of the cable.

Figure 17:
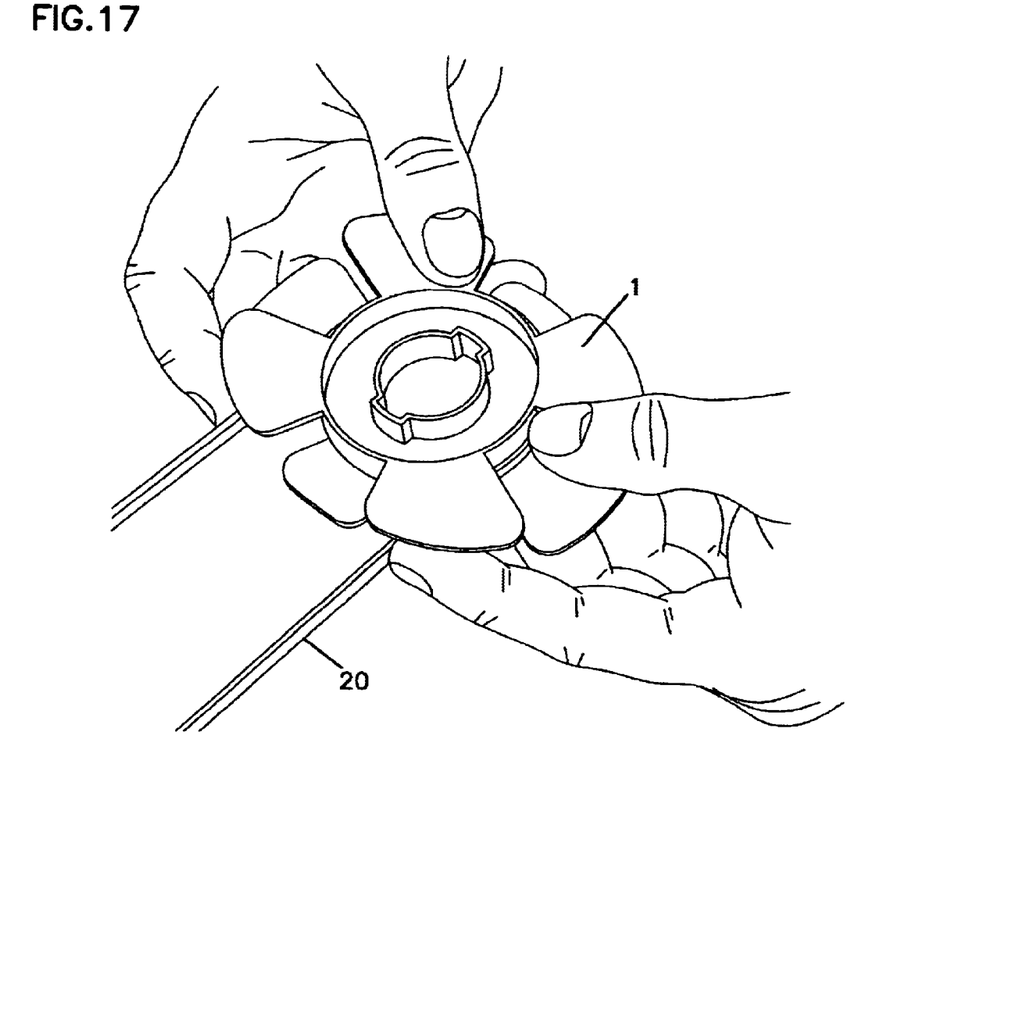
FIG. 17 is a perspective view of a fourth position in a method according to the present invention for winding cable on a spool without twisting the cable.

The crossing, first-flipping, and second-flipping steps are then repeated until there remains insufficient cable in the loop to complete an additional flip of the spool. At that point if the last flip was a second-flip, the spool may be placed in a corresponding tray for storage. If, however, the last flip was a first-flip, it may be desirable to remove the remaining crossing of the left and right lengths of cable before placing the spool in the tray, or the tray may be up-side down after a first-flip. To correct for this the spool may be "side-flipped" about an axis which is perpendicular to the axis of rotation during first and second-flipping. By side-flipping, the left-over crossing of the lengths of cable is removed and the spool is returned to its original upright position shown in FIG. 17 before it is placed in a corresponding tray.

Figure 18:
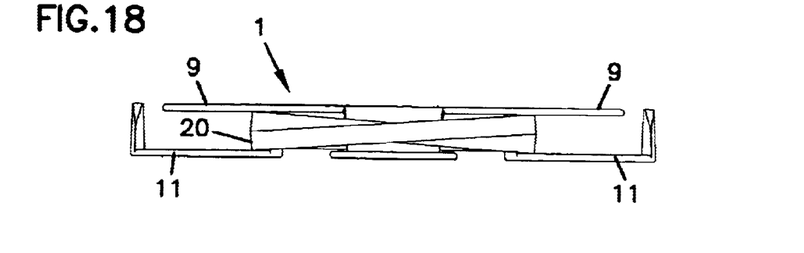
FIG. 18 is a side view of the spool according to the present invention which shows the winding pattern of ribbon cable being wound on the spool.

The resulting stored cable 20 resembles an x-pattern adjacent to fins 11 along axis C—C (See FIG. 18). The cables are crossed each half winding, but none of the cables are twisted. In FIG. 18, the major dimension of cable 20 is visible.

Once the spool has been placed in its tray any remaining length of cable in the loop which was not long enough to complete an entire flip may be stuffed onto the storage spool. If the storage spool is close to its capacity for holding cable, the step of pushing the remaining lengths of cable onto the spool may be facilitated by using a spool or tray having an oblong outer profile as discussed above. In this way the oblong shape of the tray or spool enables analog lengths of cable to be stored even when the spool is wound close to its capacity with cable.

The above specification, examples and data provide a complete description of the manufacture and use of the invention. Since many embodiments of the invention can be made without departing from the spirit and scope of the invention, the invention resides in the claims hereinafter appended.

What is claimed is:

1. A storage spool for storing telecommunications cable, the spool comprising:
    a center post having a top end and a bottom end and being characterized by a center axis, and defining a cylindrical surface;
    a plurality of radially extending bottom fins extending in a plane perpendicular to the center axis, the bottom fins extending from the bottom end of the center post, each bottom fin having an outermost edge furthest away from the center post;
    a plurality of radially extending top fins extending in a plane perpendicular to the center axis, the top fins extending from the top end of the center post, each top fin having an outermost edge furthest away from the center post;
    wherein the outermost edges of the top and bottom fins define an outer profile of the storage spool, wherein the outer profile is oblong.

2. The storage spool according to claim 1, wherein the top fins and the bottom fin axially opposes a fins are sized, shaped, and spaced around the center post so that no bottom top fin.

3. The storage spool according to claim 1, further comprising at least one guide wall attached to a top or bottom fin, the guide wall extending from the outermost edge of the respective fin and being oriented perpendicular to the respective fin and parallel to the center axis.

4. The storage spool according to claim 1, further comprising a retention tab extending from and perpendicular to a bottom fin, the retention tab being spaced from the center post a distance approximately equal to the thickness of the cable to be stored.

5. The storage spool according to claim 1, further comprising a channel wall that defines a channel inside the center post.

6. The storage spool according to claim 5, wherein the channel wall defines a ledge perpendicular to the center axis.

7. A storage spool for storing fiber cable, the spool comprising;
- a center post having a first end and a second end and being characterized by a center axis, and a channel wall that defines a channel inside the center post, the center post defining a cylindrical surface;
- a plurality of radially extending second-end fins extending in a plane perpendicular to the center axis, the second-end fins extending from the second end of the center post, each second-end fin having an outermost edge furthest away from the center post;
- a plurality of radially extending first-end fins extending in a plane perpendicular to the center axis, the first-end fins extending from the first end of the center post, each first-end fin having an outermost edge furthest away from the center post; wherein the outermost edges of the first-end and second-end fins define an oblong outer profile of the storage spool;
- a guide wall attached to at least one first-end or second-end fin, the guide wall extending from the outermost edge of the attached fin and being oriented perpendicular to the attached fin and parallel to the center axis.

8. A cable storage device comprising:
   (a) a spool including:
   (i) a center post having a top end and a bottom end and being characterized by a center axis;
   (ii) a plurality of radially extending bottom fins extending in a plane perpendicular to the center axis, the bottom fins extending from the bottom end of the center post, each bottom fin having an outermost edge furthest away from the center post;
   (iii) a plurality of radially extending top fins extending in a plane perpendicular to the center axis, the top fins extending from the top end of the center post, each top fin having an outermost edge furthest away from the center post;
   (b) a tray including:
   (i) a bottom plate, the bottom plate defining holes shaped to allow the bottom fins of the spool to be coplanar with the bottom plate when the spool is placed in the tray;
   (ii) a sidewall perpendicular to the bottom plate and extending from the bottom plate to define a spool chamber, the spool being received in the spool chamber, the sidewall defining an entry port and an exit port for allowing entry and exit of the cable to be stored.

9. The storage device according to claim 8, wherein the spool further comprises a channel wall that defines a channel inside the center post; and wherein the tray further comprises a column extending from the bottom plate, the column received within the channel of the spool.

10. The storage device according to claim 9, wherein the channel wall defines a ledge perpendicular to the center axis; and wherein the column of the tray comprises a flexible clip, the flexible clip having a push tab and a protruding edge, the protruding edge being configured to fit into the ledge of the channel wall of the spool, wherein the spool may be removed from the column only when the push tab is depressed.

11. The storage device according to any of claims 8–10, wherein the tray further comprises hinge tabs for rotatably mounting the tray to a storage tray mount.

12. A tray for storing a spool of telecommunications cable, the spool having a center post and outwardly extending bottom fins, the tray comprising:
- a bottom plate, the bottom plate defining holes shaped to allow the bottom fins of the spool to be coplanar with the bottom plate when the spool is placed in the tray;
- a side wall perpendicular to the bottom plate and extending from of the bottom plate to define a spool chamber for receiving the spool, the sidewall defining an entry port and an exit port for allowing entry and exit of the cable to be stored.

13. A tray according to claim 12, further comprising hinge tabs for rotatably mounting the tray to a storage tray mount.

\* \* \* \* \*

UNITED STATES PATENT AND TRADEMARK OFFICE
CERTIFICATE OF CORRECTION

PATENT NO.    : 6,612,515 B1
DATED         : September 2, 2003
INVENTOR(S)   : Tinucci et al.

It is certified that error appears in the above-identified patent and that said Letters Patent is hereby corrected as shown below:

Column 6,
Line 55, delete "fin axially opposes a"
Line 57, "top fin." should read -- fin axially opposes a top fin. --

Column 7,
Line 7, "comprising;" should read -- comprising: --

Signed and Sealed this

Twenty-seventh Day of January, 2004

JON W. DUDAS
*Acting Director of the United States Patent and Trademark Office*